(12) United States Patent
Lee

(10) Patent No.: US 9,108,254 B2
(45) Date of Patent: Aug. 18, 2015

(54) PIN MILLER INSERTS AND A CUTTER USING SAME

(71) Applicant: TaeguTec, Ltd., Daegu (KR)

(72) Inventor: Young Ho Lee, Daegu (KR)

(73) Assignee: TaeguTec, Ltd., Daegu (KR)

( * ) Notice: Subject to any disclaimer, the term of this patent is extended or adjusted under 35 U.S.C. 154(b) by 243 days.

(21) Appl. No.: 13/845,724

(22) Filed: Mar. 18, 2013

(65) Prior Publication Data

US 2013/0266392 A1     Oct. 10, 2013

Related U.S. Application Data

(63) Continuation-in-part of application No. PCT/KR2011/005710, filed on Aug. 3, 2011.

(30) Foreign Application Priority Data

Sep. 17, 2010  (KR) .................. 10-2010-0091981

(51) Int. Cl.
    *B23C 5/08*    (2006.01)
    *B23C 5/00*    (2006.01)
    *B23C 3/06*    (2006.01)
    *B23C 5/20*    (2006.01)

(52) U.S. Cl.
    CPC . *B23C 5/006* (2013.01); *B23C 3/06* (2013.01); *B23C 5/08* (2013.01); *B23C 5/207* (2013.01); *B23C 2200/085* (2013.01); *B23C 2200/125* (2013.01); *B23C 2200/283* (2013.01);
    (Continued)

(58) Field of Classification Search
    CPC ...... B23C 5/08; B23C 5/226; B23C 2200/16; B23C 2200/162; B23C 2200/367

USPC ..................................... 407/42, 113
    See application file for complete search history.

(56) References Cited

U.S. PATENT DOCUMENTS 3,708,843 A * 1/1973 Erkfritz ......................... 407/38
5,244,318 A * 9/1993 Arai et al. ...................... 407/42
(Continued)

FOREIGN PATENT DOCUMENTS

JP   2002307228 A  * 10/2002
KR   10-0937459 B1    1/2010

OTHER PUBLICATIONS

International Search Report dated Mar. 9, 2012 issued in PCT counterpart application (No. PCT/KR2011/005710).
(Continued)

*Primary Examiner* — Sunil K Singh
*Assistant Examiner* — Alan Snyder
(74) *Attorney, Agent, or Firm* — Womble Carlyle

(57) ABSTRACT

An indexable hexahedral cutting insert has opposing top and bottom abutting faces, opposing rake faces connecting to opposing side faces, and a central hole passing through the abutting faces. Each rake face is wider in the top-to-bottom direction at a different one of the side faces. Arcuate corner portions with one-directional curvature are formed along intersecting portions between the abutting faces and the side faces. Each abutting face has first and second wedge-shaped inclined planes adjoining and inclining toward corresponding first and second rake faces. Each inclined plane has a base side at a cutting edge formed at the border with one of the rake faces, and a width which gradually increases from one corner portion to the opposite corner portion along the abutting face. Each corner portion has an associated inclined arcuate surface adjacent to the wide end of the wedge-shaped inclined planes.

5 Claims, 4 Drawing Sheets

(52) U.S. Cl.
CPC ..... *B23C2200/367* (2013.01); *B23C 2210/503* (2013.01); *B23C 2220/68* (2013.01); *Y10T 407/23* (2015.01); *Y10T 409/30952* (2015.01)

(56) References Cited

U.S. PATENT DOCUMENTS

| | | | |
|---|---|---|---|
| 5,586,843 | A | 12/1996 | Minicozzi |
| 6,764,254 | B2 | 7/2004 | Emoto et al. |
| 2005/0023044 | A1* | 2/2005 | Schuffenhauer et al. ..... 175/426 |
| 2005/0169716 | A1* | 8/2005 | Smilovici et al. ............. 407/113 |
| 2010/0047028 | A1 | 2/2010 | Mergenthaler et al. |

OTHER PUBLICATIONS

Written Opinion dated Mar. 9, 2012 issued in PCT counterpart application (No. PCT/KR2011/005710).

* cited by examiner

PIN MILLER INSERTS AND A CUTTER USING SAME

RELATED APPLICATIONS

This is a Continuation-in-Part of International Application No. PCT/KR2011/005710, filed 3 Aug. 2011 and published as WO 2012/036379A2, which claims priority to KR 10-2010-0091981, filed 17 Sep. 2010. The contents of the aforementioned applications are incorporated by reference in their entirety

FIELD OF THE INVENTION

This disclosure is related to a pin miller insert and a milling cutter using the same.

BACKGROUND

In roughing the pin or journal parts of crank shafts which are generally steel, the depth of cut is large, a large dish angle is required to minimize the contact on the work-piece, and cutting edges are required to be strong as well.

Conventionally, there have been two types of inserts applied for the purpose of crank shaft machining: one is rectangular type or the other is parallelogrammic type.

A rectangular type insert has a parallelogrammic rake face to allow a large dish angle for decreasing the contact on the work-piece. In this case, error proofing in manufacturing is difficult and a positive axial rake angle is hard to be achieved.

Since a parallelogrammic type insert such as disclosed in U.S. Pat. No. 6,764,254 has a rectangular rake face, it does not provide a large dish angle. Therefore, this type of insert tends to have a large contact resistance on the work-piece of crank shafts.

SUMMARY OF THE INVENTION

The present disclosure aims to provide a pin miller insert and a milling cutter allowing a large dish angle so as to minimize the contact resistance while machining crank shafts.

This invention aims also to enhance the strength of the main cutting edges of the insert and make its clamping screw durable.

A hexahedral insert according to the present disclosure has an opposed pair of top and bottom abutting faces, an opposed pair of rake faces, and an opposed pair of side faces with a central hole passing through each central portion of the abutting faces. Arcuate corner portions with one-directional curvature are formed along the intersecting portions between the abutting faces and side faces; the central hole is substantially perpendicular to the abutting faces and parallel to the rake faces and side faces; the upper abutting face has a first wedge-shaped inclined plane adjoining and inclining toward a first rake face, the first wedge-shape having a base side at a cutting edge formed at the border to the first rake face and having a width starting at the border with a first corner portion and increasing gradually to a maximum at the border to a second corner portion and a second wedge-shaped inclined plane adjoining and inclining toward a second rake face, the second wedge-shape having a base side at a cutting edge formed at the border to the second rake face and having a width starting at the border with the second corner portion and increasing gradually to a maximum at the border to the first corner portion; and the second corner portion has a first inclined arcuate surface having continuity of gradient and width at the border to the first wedge-shaped inclined plane and the first corner portion has a second inclined arcuate surface having continuity of gradient and width at the border to the second wedge-shaped inclined plane, wherein the wedge-shaped inclined planes and the inclined arcuate surfaces are formed on the abutting faces and corner portions in top-and-bottom symmetricity such that the first rake face has a larger width on the side of the first corner portion whereas the second rake face has a larger width on the side of the second corner portion.

The inclined arcuate surfaces of the insert according to the present disclosure have a width disappearing at the border to the side faces.

The top and bottom abutting faces of the insert according to the present disclosure are shaped of parallelograms having an acute angle at the diagonal corners neighboring to the side of a larger width of the rake faces.

A milling cutter according to the present disclosure has a substantially cylindrical insert-mounting surface and a plurality of the inserts mounted on the insert-mounting surface with rake faces facing the direction of rotation of the insert-mounting surface, wherein the plurality of the inserts include a first set of inserts with a first orientation and a second set of inserts with a second orientation arranged in a staggered manner axially on the insert-mounting surface; the inserts in the first orientation are disposed such that the side of the rake faces of a larger width forms the front end axially of the insert-mounting surface, whereas the inserts in the second orientation are disposed such that the side of the rake faces of a larger width forms the rear end axially of the insert-mounting surface; and the central hole axis of the inserts in the first orientation is axially inclined to the rear and radially inclined forwardly in rotational direction relative to the radius of the insert-mounting surface, whereas the central hole axis of the inserts in the second orientation is axially inclined to the front and radially inclined forwardly in rotational direction relative to the radius of the insert-mounting surface.

Since the insert according to this disclosure when mounted on a milling cutter allows an inclined orientation, the side faces of the inserts can make a dish angle so as to minimize the contact resistance to the work-piece during machining. Since the main cutting edges have a negative rake angle, strength of the main cutting edges is enhanced. The insert according to this disclosure has the structure making its clamping screws durable. Also, the insert according to this disclosure allows a stable clamping in the pocket and is secured by maintaining a constant contact area against the pocket side wall.

DETAILED DESCRIPTION

Hereinafter, detailed embodiments according to the present disclosure are described. However, the present invention can be realized in other various forms, and is not limited to the embodiments explained herein. The figures attached to the present disclosure are merely for convenience of explanation, and the shapes and the relative scales may be exaggerated or distorted. Some portions of the figures which are not necessary for explaining the features of the present invention may be abridged for clearer explanation of the invention.

Figure 1:
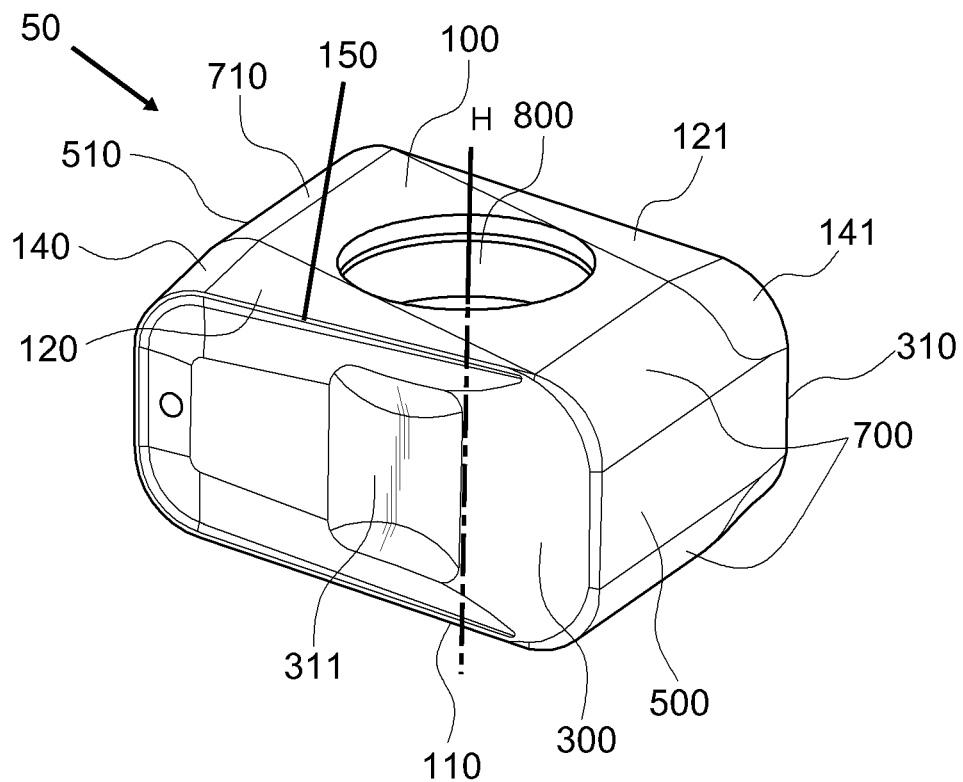
FIG. 1 is a perspective view of an insert in accordance with the present disclosure.

FIG. 1 is a perspective view of a pin miller insert 50 in accordance with the present disclosure. This insert is mountable on a crank pin milling cutter.

As shown in FIG. 1, the insert has a hexahedral shape having an opposed pair of top and bottom abutting faces 100,110, an opposed pair of rake faces 300,310, and an opposed pair of side faces 500,510 with a central hole 800 having axis H passing through each central portion of the abutting faces, wherein arcuate corner portions 700,710 are formed along the intersecting portions between the abutting faces 100,110 and side faces 500,510. The arcuate corner portions 700,710 have curvature one-directionally. The central hole 800 is disposed to be substantially perpendicular to the abutting faces 100,110 and parallel to the rake faces 300,310 and side faces 500,510.

The upper abutting face 100 has a first wedge-shaped inclined plane 120 adjoining and inclining toward a first rake face 300, the first wedge-shape having a base side at a first top cutting edge 150 formed at the edge border 120a to the first rake face 300 and having a width starting at the first border 700a with a first corner portion 700 and increasing gradually to a maximum at the second border 710a with a second corner portion 710. And the upper abutting face 100 also has a second wedge-shaped inclined plane 121 adjoining and inclining toward a second rake face 310, the second wedge-shape having a base side at a second top cutting edge 151 formed at the edge border 121a to the second rake face 310 and having a width starting at the first border 710b with the second corner portion 710 and increasing gradually to a maximum at the second border 700b with the first corner portion 700. It is understood that the bottom abutting face 110 has corresponding wedge-shaped inclined planes and corresponding first and second bottom cutting edges.

The second corner portion 710 has a first inclined arcuate surface 140 having continuity of gradient and width at the second border 710a to the first wedge-shaped inclined plane 120 and the first corner portion 700 has a second inclined arcuate surface 141 having continuity of gradient and width at the second border 700b to the second wedge-shaped inclined plane 121, as shown in FIG. 1.

Figure 2:
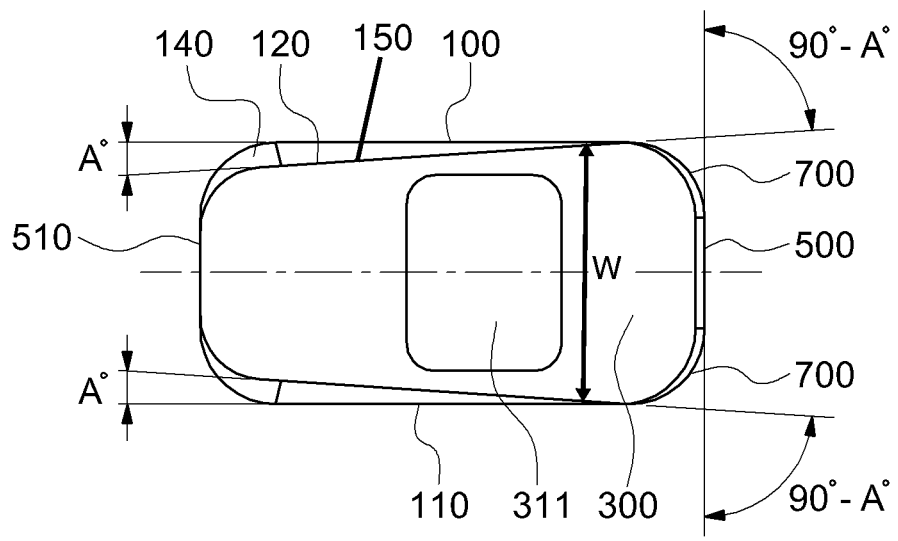
FIG. 2 is a front view of an insert in accordance with the present disclosure as seen in the direction J of FIG. 3.

The wedge-shaped inclined planes 120,121 and the inclined arcuate surfaces 140,141 are formed on the abutting faces 100,110 and corner portions 700,710 in top-and-bottom symmetricity. As a result, the first rake face 300 has a larger width W on the side of the first corner portion 700, whereas the second rake face 310 has a larger width on the side of the second corner portion 710. As shown in FIG. 2, the width W of the first rake faces 300 is gradually narrowed by a slope of A° from the sided of the first corner portion 700 toward the side of the second corner portion 710 so that the corner angles of the first rake face 300 on the side of the first corner portion 700 are acute angle of 90°-A°. And as seen in the FIG. 2 front view of the insert rake face 300, the top and bottom cutting edges converge towards one another in a direction from one side face 500 to the other side face 510.

Figure 3:
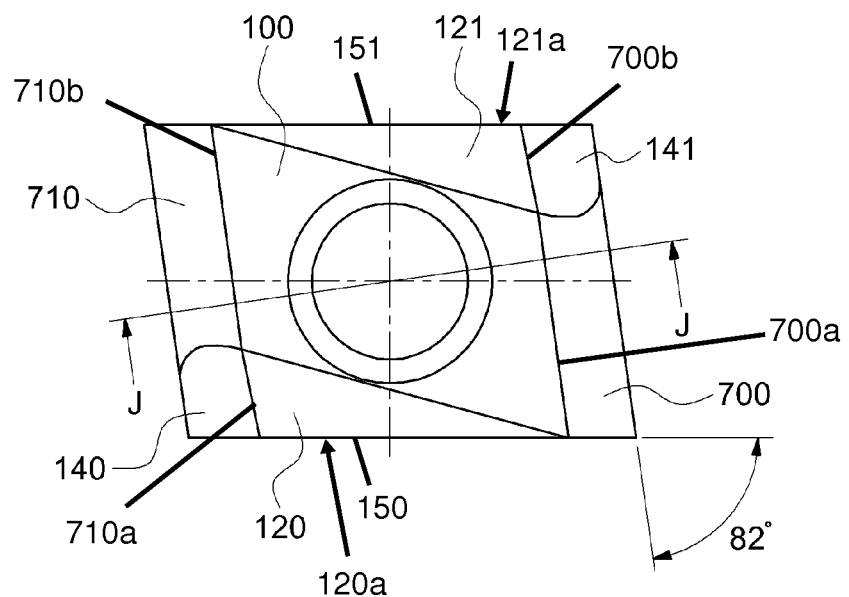
FIG. 3 is a planar view of an insert in accordance with the present disclosure.

As shown in FIGS. 1 and 3, the inclined arcuate surfaces 140,141 preferably have a width disappearing at the border to the side faces 550, 510.

As shown in FIG. 3, the top and bottom abutting faces 100,110 are shaped of parallelograms having an acute angle at the diagonal corners neighboring to the side of a larger width of the rake faces 300,310.

The rake faces 300,310 may be of chip forming concave surface and be provided with a captive pocket 311.

Figure 4:
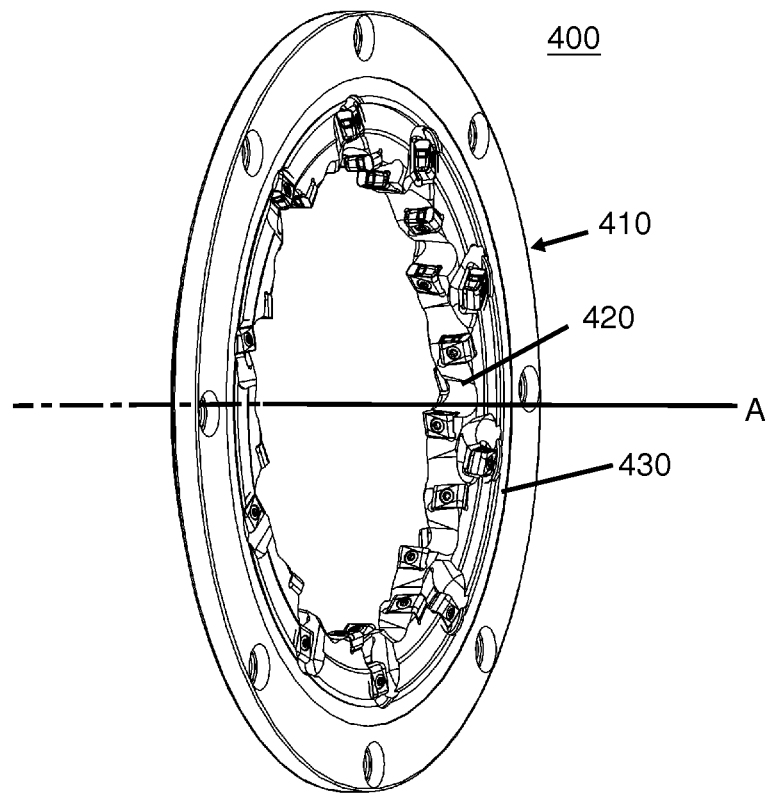
FIG. 4 is a perspective view of a crank pin milling cutter in accordance with the present disclosure.

FIG. 4 shows a crank pin milling cutter 400 mounted with the inserts in accordance with the present disclosure. As shown in FIG. 4, the crank pin milling cutter generally includes a ring-type cutter body 410 provided with an inner cylindrical wall 420 and side walls 430 for insert mounting. In other applications, inserts may be mounted on the outer cylindrical periphery.

Hereinafter, the cutter is explained for an example case where the insert mounting surface is provided on the inner cylindrical surface, and explanation about inserts mounted on the side walls of the cutter body is omitted.

The milling cutter in accordance with the present disclosure includes a cutter body having a substantially cylindrical insert-mounting surface 900 and a plurality of the inserts explained above. The inserts are mounted on the insert-mounting surface with rake faces 300 facing the direction of rotation of the insert-mounting surface of the cutter body.

Figure 5:
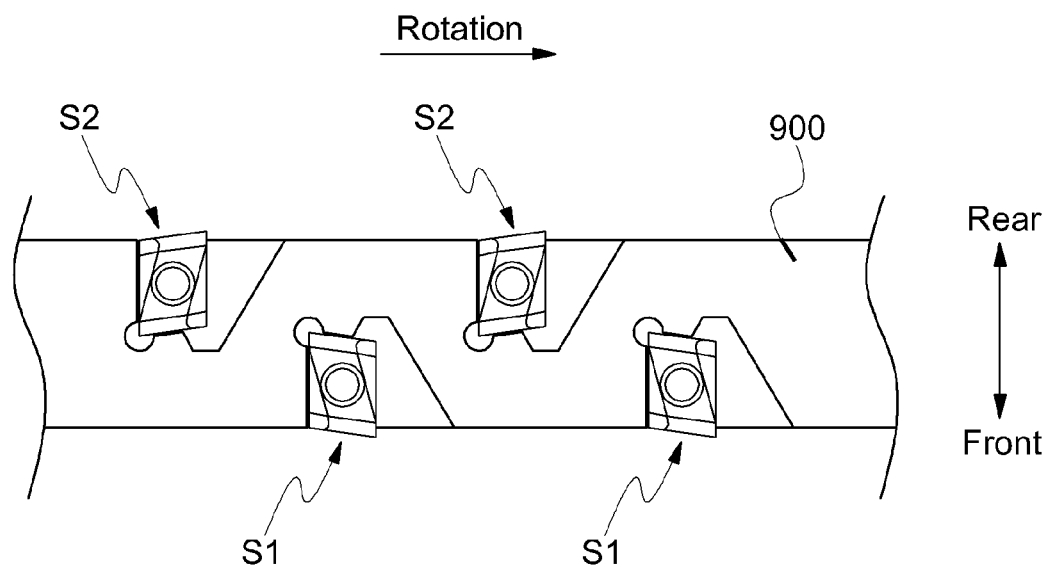
FIG. 5 is a view showing the cutter body as seen from the inner peripheral side.

As shown in FIG. 5, the plurality of the inserts include at least a first set of inserts with a first orientation S1 and a second set of inserts with a second orientation S2 arranged in a staggered manner axially on the insert-mounting surface. The axial direction here means the direction of the rotational axis A of the cutter body (See FIG. 4). Of course, additional sets of inserts with other orientations can be disposed as needed, as shown in FIG. 4.

The inserts in the first orientation S1 are disposed such that the side of the rake faces of a larger width forms the front end axially of the insert-mounting surface, whereas the inserts in the second orientation S2 are disposed such that the side of the rake faces of a larger width forms the rear end axially of the insert-mounting surface.

Figure 6:
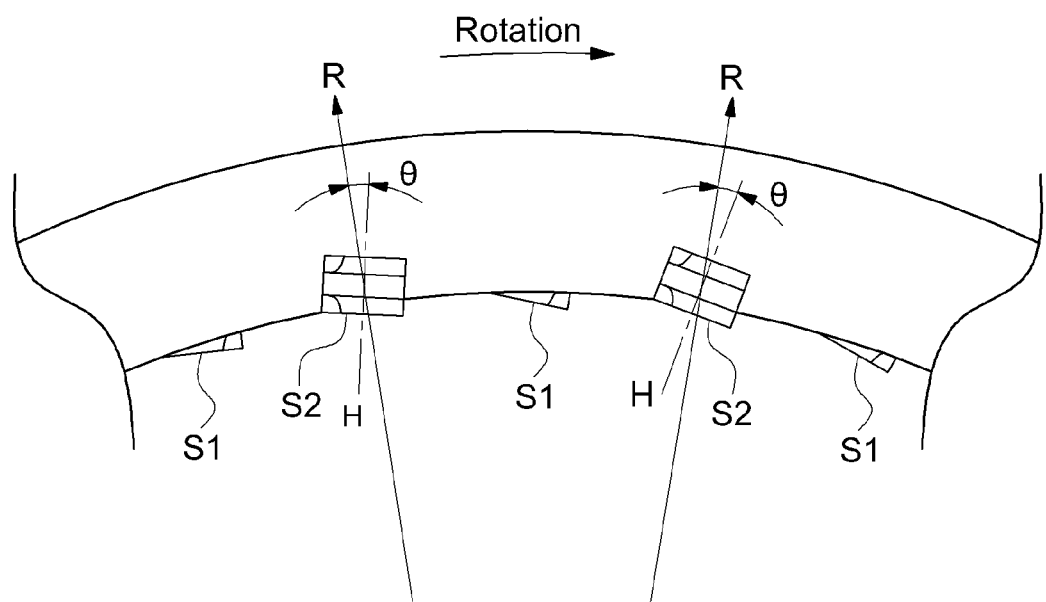
FIG. 6 is a view showing a portion of the cutter body as seen in the axial direction.
Figure 7:
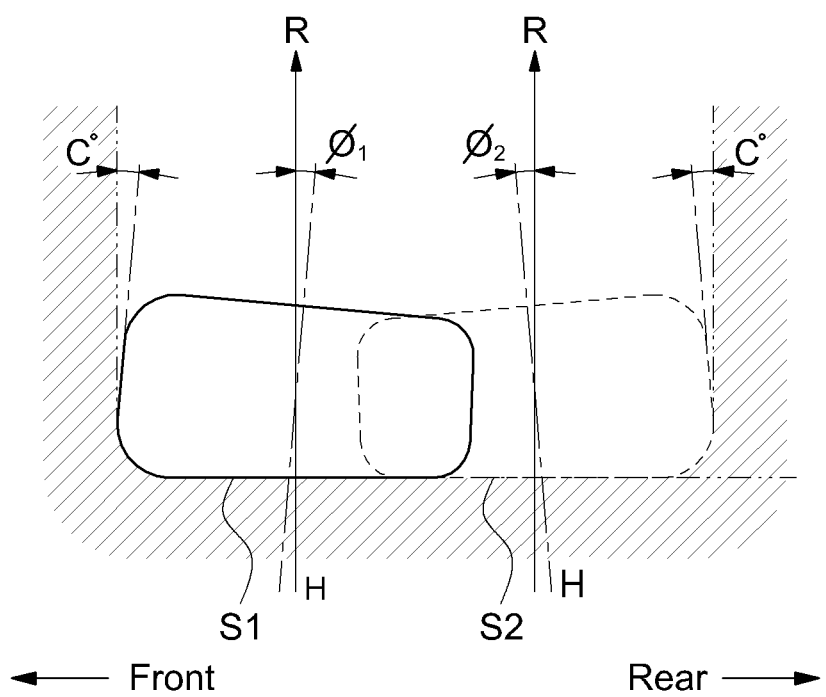
FIG. 7 is a view showing how the inserts are arranged, as seen from front in the rotational direction of the cutter body.

As shown in FIGS. 6 and 7, the central hole axis H of the inserts in the first orientation (S1) is inclined axially to the rear (by angle of φ1) and radially inclined forwardly in rotational direction (by angle of θ) relative to the radius R of the insert-mounting surface, whereas the central hole axis H of the inserts in the second orientation (S2) is axially inclined to the front (by angle of φ2) and radially inclined forwardly in rotational direction (by angle of θ) relative to the radius R of the insert-mounting surface 900.

The present technique has the following technical effects:

Since the central hole axis H of the inserts can be disposed in an inclined orientation by utilizing the structural features of the wedge-shaped inclined planes 120,121 formed on the abutting faces 100, the side faces 500 of the inserts mounted on a milling cutter can make a dish angle C.° as shown in FIG. 7 so as to minimize the contact resistance to the work-piece during machining.

Since the main cutting edges formed by wedge-shaped inclined planes 120,121 and rake faces 300,310 have a negative rake angle, the main cutting edges are strengthened without having to have additional negative lands.

Since the flat portion of the side face 500 of the inserts is parallel to the central hole axis H, no resisting force while machining is transmitted through the insert pocket walls to the clamping screws of the inserts and clamping screws become durable.

Since the flat portion of the side face 500 of the inserts is kept unvaried while curvature of the corner portion 700,710 is varied, a stable clamping of the inserts in the pocket is secured by maintaining a constant contact area against the pocket side wall.

DESCRIPTION OF REFERENCE NUMERALS

| | |
|---|---|
| 50: insert | H: insert central hole axis |
| 100: upper abutting faces | 110: lower abutting faces |
| 120: first wedge-shaped inclined plane | 121: second wedge-shaped inclined plane |
| 120a: edge border of cutting edge 150 | 121a: edge border of cutting edge 151 |
| 140: first inclined arcuate surface | 141: second inclined arcuate surface |
| 150: cutting edge | 151: cutting edge |
| 300: first rake face | 310: second rake face |
| 311: captive pocket | A: cutter body rotational axis |
| 400: milling cutter | 410: cutter body |
| 420: inner cylindrical wall | 430: side wall of cutter body |
| 500: side face | 510: side face |
| 700: first corner portions | 710: second corner portions |
| 700a: first border with corner portion 700 | 700b: 2nd border with corner portion 700 |
| 710a: 2nd border with corner portion 710 | 710b: first border with corner portion 710 |
| 800: central hole | 900: insert-mounting surface |
| W: width of rake face | |

What is claimed is:

1. A hexahedral insert having an opposed pair of top and bottom abutting faces, an opposed pair of rake faces, and an opposed pair of side faces with a central hole passing through each central portion of the abutting faces, wherein each rake face has top and bottom cutting edges associated with respective top and bottom abutting faces;

arcuate corner portions with one-directional curvature are formed along the intersecting portions between the abutting faces and side faces;

the central hole is substantially perpendicular to the abutting faces and parallel to the rake faces and side faces;

the top abutting face has:

a first wedge-shaped inclined plane adjoining and inclining toward a first rake face, the first wedge-shape having a base side at a first top main cutting edge formed at an edge border to the first rake face and having a width starting at a first border with a first corner portion and increasing gradually to a maximum at a second border with a second corner portion, and a second wedge-shaped inclined plane adjoining and inclining toward a second rake face, the second wedge-shape having a base side at a second top main cutting edge formed at an edge border to the second rake face and having a width starting at a border with the second corner portion and increasing gradually to a maximum at a border with the first corner portion; and the second corner portion has a first inclined arcuate surface having continuity of gradient and width at the second border to the first wedge-shaped inclined plane and the first corner portion has a second inclined arcuate surface having continuity of gradient and width at the second border to the second wedge-shaped inclined plane, wherein the wedge-shaped inclined planes and the inclined arcuate surfaces are formed on the abutting faces and corner portions in top-and-bottom symmetricity such that the first rake face has a larger width on the side of the first corner portion whereas the second rake face has a larger width on the side of the second corner portion; and in a front view of each rake face, the top and bottom cutting edges converge towards one another in a direction from one side face to the other side face.

2. The insert as claimed in claim 1, wherein the inclined arcuate surfaces have a width disappearing at a border to the side faces.

3. The insert as claimed in claim 1, wherein the top and bottom abutting faces are shaped of parallelograms having an acute angle at the diagonal corners neighboring to the side of a larger width of the rake faces.

4. A milling cutter comprising a cutter body having a rotational axis (A), a direction of rotation, a substantially cylindrical insert-mounting surface and a plurality of inserts in accordance with claim 1 mounted on the insert-mounting surface with rake faces facing the direction of rotation.

5. The milling cutter as claimed in claim 4, wherein the plurality of the inserts include a first set of inserts with a first orientation and a second set of inserts with a second orientation arranged in a staggered manner axially on the insert-mounting surface;

the inserts in the first orientation are disposed such that the side of the rake faces of a larger width forms the front end axially of the insert-mounting surface, whereas the inserts in the second orientation are disposed such that the side of the rake faces of a larger width forms the rear end axially of the insert-mounting surface;

the central hole of each insert has a central hole axis;

the central hole axis in each of the inserts in the first orientation is axially inclined to the rear and radially inclined forwardly in rotational direction relative to the radius of the insert-mounting surface; and the central hole axis in each of the inserts in the second orientation is axially inclined to the front and radially inclined forwardly in rotational direction relative to the radius of the insert-mounting surface.

* * * * *